3,361,820
PINENE DERIVATIVE
Robert W. White, Willingboro, N.J., and Stella W. King, Elkins Park, Pa., assignors to Rohm & Haas Company, Philadelphia, Pa., a corporation of Delaware
No Drawing. Filed Apr. 8, 1965, Ser. No. 446,734
3 Claims. (Cl. 260—586)

This invention deals with a pinene derivative having the formula

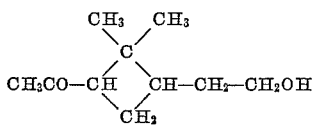

The compound of the present invention is prepared from pinonic aldehyde by reaction with hydrogen in the presence of a hydrogenation catalyst.

The reactant, pinonic aldehyde, is a known composition of matter which may be prepared from pinene by ozonolysis and subsequent hydrogenation at moderately low temperatures and typical pressures, as is understood by those skilled in the art.

The reaction of the present invention is conducted in the presence of nickel, cobalt or rhodium hydrogenation catalysts, such as the typical Raney nickel or Raney cobalt.

The reaction is conducted in the temperature range of about 20° to 80° C., preferably 30° to 60° C. Pressures of about 50 to 500 p.s.i.g., preferably 50 to 200 p.s.i.g., are employed. The reaction proceeds on a substantially mole for mole basis. The course of the reaction can be followed by observing the absorption of hydrogen and resultant drop in pressure. When one mole of hydrogen has been absorbed per mole of pinonic aldehyde, the reaction is substantially complete.

At the conclusion of the reaction, the catalyst is removed by conventional techniques and the product isolated by standard methods, such as by distillation or the like.

The product is useful as an odor supplying ingredient for perfume or disinfectant compositions. The present compound is used in typical amounts in these compositions and in disinfectant solutions is incorporated with a surface-active agent and water to make the finished formulation.

This invention may be more fully understood from the following illustrative example.

*Example*

A solution of 168 g. of pinonic aldehyde in 150 ml. of methanol was charged to a one-liter stirred autoclave, which contained 10 g. of Raney nickel catalyst. The autoclave was flushed with hydrogen and the hydrogen pressure was adjusted to 450 p.s.i.g. The contents of the autoclave were heated to 40° C. and stirring was continued until one mole of hydrogen had been absorbed. The excess hydrogen was vented and the catalyst was removed by filtration. The product was distilled to yield 154 g. (91% yield) of the desired ketoalcohol, 1-acetyl-2,2-dimethyl-3-(2-hydroxyethyl)-cyclobutane, B.P. 88° to 90° C. (0.1 mm. absolute pressure, $n_D^{26}$ 1.4666.

We claim:
1. A method for the preparation of the compound having the formula

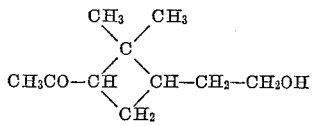

comprising reacting the compound having the formula

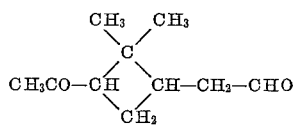

with hydrogen in the presence of a hydrogenation catalyst selected from the group consisting of nickel, cobalt and rhodium in the temperature range of about 20° to 80° C. and at a pressure of about 50 to 500 p.s.i.g.

2. The method according to claim 1 in which the reaction is conducted in the temperature range of about 30° to 60° C. and at a pressure of about 50 to 200 p.s.i.g.

3. The method according to claim 1 wherein said catalyst is Raney nickel.

References Cited

UNITED STATES PATENTS 2,824,138   2/1958   Wystrach et al. _____ 260—587

OTHER REFERENCES

Adkins et al.: J. Am. Chem. Soc., vol. 61, pp. 3303 to 3306 (1939).

Faget et al.: Compt. Rend., vol. 258(2), pp. 600–603 (1964).

Weissberger: "Catalytic, Photochemical, Electrolytic Reactions," 2nd Ed., pp. 115–6 (1956).

LEON ZITVER, *Primary Examiner.*

BERNARD HELFIN, *Examiner.*

M. M. JACOB, *Assistant Examiner.*